United States Patent [19]

Holmes

[11] 4,220,187
[45] Sep. 2, 1980

[54] SELF-LOCKING FASTENER

[76] Inventor: Horace D. Holmes, 28576 Green Willow, Farmington Hills, Mich. 48018

[21] Appl. No.: 912,128

[22] Filed: Jun. 2, 1978

Related U.S. Application Data

[63] Continuation-in-part of Ser. No. 788,296, Apr. 18, 1977, abandoned.

[51] Int. Cl.² .............................................. F16B 39/28
[52] U.S. Cl. ......................................... 151/20; 151/22
[58] Field of Search ............... 151/20, 15, 22, 14 R, 151/21 C

[56] References Cited

U.S. PATENT DOCUMENTS

| 323,560 | 8/1885 | Burdick | 151/20 X |
|---|---|---|---|
| 628,732 | 7/1899 | Wing | 151/20 X |
| 724,196 | 3/1903 | Marshall | 151/20 |
| 900,796 | 10/1908 | Tambling | 151/20 |
| 1,105,222 | 7/1914 | Tollerton | 151/20 X |
| 1,702,878 | 2/1929 | Mersfelder et al. | 151/22 X |
| 2,019,049 | 10/1935 | Hoke | 85/20 X |
| 3,438,417 | 4/1969 | Albris | 151/20 X |
| 3,877,502 | 4/1975 | Hunckler | 151/20 |

FOREIGN PATENT DOCUMENTS

| 791370 | 9/1935 | France | 151/20 |
|---|---|---|---|
| 831922 | 6/1938 | France | 151/20 |
| 1233134 | 5/1960 | France | 151/20 |
| 1512360 | 1/1968 | France | 151/20 |
| 555107 | 1/1957 | Italy | 151/20 |

Primary Examiner—Ramon S. Britts
Attorney, Agent, or Firm—Krass & Young

[57] ABSTRACT

This invention relates to fasteners and more particularly to a male or female fastener element, such as a bolt or nut, having a skewed external work contacting surface such that when the fastener element is tightened onto another fastener element, and against a workpiece, a substantial lateral loading is produced. Such loading causes the male and female threads to shift laterally into an asymmetric, jammed configuration which has been found to exhibit extraordinary resistance to loosening under conditions of vibration. The nut thread is characterized by a helical flat at the major diameter thereof to make positive contact with the crown of the bolt thread when lateral skewing occurs.

2 Claims, 8 Drawing Figures

SELF-LOCKING FASTENER

REFERENCE TO RELATED APPLICATIONS

This application is a continuation-in-part of U.S. Ser. No. 788,296, filed Apr. 18, 1977, entitled Self-Locking Nut, now abandoned.

INTRODUCTION

This invention relates to fasteners and more particularly to a male or female fastener element, such as a bolt or nut, having a skewed external work contacting surface such that when the fastener element is tightened onto another fastener element, and against a workpiece, a substantial lateral loading is produced.

BACKGROUND OF THE INVENTION

There exists a substantial need for fastener combinations which, when properly axially stressed, resist the normal tendency to unwind and loosen, particularly in the presence of vibration. Numerous approaches to the development of locking thread forms and so-called lock nuts have resulted.

One example of a locking thread form is disclosed in the British Specification No. 335,598 to British Dardelet Thread Lock Corporation, Limited. In that disclosure the male and female thread forms are generated so as to exhibit mating surfaces which lie at an angle of about 6° from the thread axis such that when axial loading occurs the mating surfaces come into forceful engagement to produce a telescopic wedging action. The frictional force produced by the telescopically mating surfaces quickly builds up to extremely high levels, thus tending to prevent removal or loosening of the nut on the bolt. Unfortunately, the wedging action also resists on-torque and can prevent the application of sufficient axial stress in the bolt to produce a proper integration of the fastened members.

Another, radically different, approach to the development of a vibration resistant fastener combination is disclosed in my co-pending application for U.S. Patent Ser. No. 770,411 filed Feb. 18, 1977, now abandoned. According to the disclosure of that patent application, the thread form of the female fastener element has one flank thereof truncated adjacent the crown of the thread form to define an internal ramp or flat which lies at an angle between about 15° and 30° relative to the thread axis. When the fastener combination is axially loaded, the crown of the male thread is displaced into engagement with the flat such that relative lateral movement between the fastener elements under vibration conditions is prevented. I have found that this thread form combination and the resulting prevention of lateral movement between the fastener elements causes a properly axially loaded fastener combination to exhibit substantial resistance to unwinding in the presence of vibration. Moreover, my thread form, when placed in the female fastener element, allows the use of conventional male fastener elements, permits substantial axial loading or stressing of the fastener combination before excessive resistive torque is developed and, as a result, permits fastener combinations to be more easily disassembled than is the case for Dardelet-type elements.

Another prior art fastener of which I am aware is disclosed in U.S. Pat. No. 3,989,082 to T. R. Pinchback. That patent discloses a free-spinning nut with an asymmetric recess in its bearing face which purportedly causes the nut to deform asymmetrically in the loaded condition to laterally shift the nut relative to the male fastener element. According to the specification proper functioning of the Pinchback nut appears to depend upon not only the size and configuration of the aforementioned recess but also the proper relative hardnesses between the nut and the workpiece in contact with the nut.

BRIEF SUMMARY OF THE INVENTION

In accordance with the present invention, a vibration resistant fastener combination results from the operative engagement of a male element, such as a conventional bolt, and a nut or other female fastener element of such configuration as to cause a lateral loading or jamming of the respective fastener elements relative to the thread axis, but without the need for the asymmetric recesses and the concern for relative hardnesses which characterize the Pinchback nut. In general, this is accomplished by forming an external bearing surface of the nut so as to produce laterally opposite work contact points lying in a plan which is non-orthogonal to the thread axis, and a helical flat in the nut thread to receive the crown of the bolt thread into positive engagement therewith when a lateral skewing or shift occurs. As hereinafter described, this may be achieved in a variety of specific implementations, the end result in all cases being to produce a lateral loading between the nut and bolt, causing the nut to jam laterally on the bolt as hereinafter more fully described.

Although I believe the preferred form of my invention involves forming the nut with at least one skewed or nonnormal bearing surface, I also disclose other possible implementations in the drawings and in the following specification.

DETAILED DESCRIPTION OF THE SPECIFIC EMBODIMENTS

Figure 1:
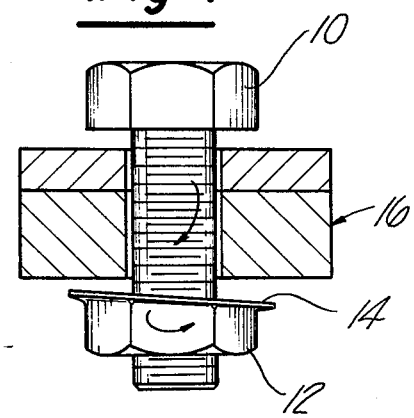
FIG. 1 is a schematic diagram of a fastener combination employing a flange nut having a skewed bearing surface.
Figure 2:
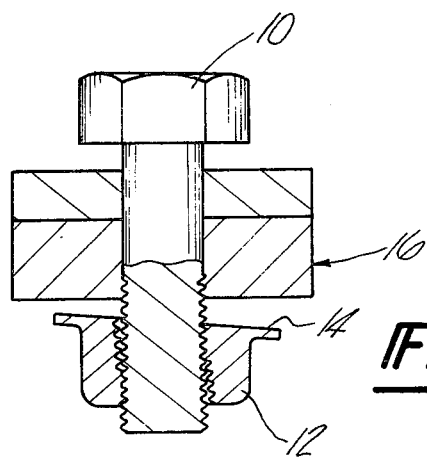
FIG. 2 is a perspective drawing of a fastener combination using the nut of FIG. 1 and showing the lateral jamming which is produced when the fastener combination is fully tightened.

Referring to FIGS. 1 and 2, a fastener combination is shown to comprise a male fastener element in the form of a conventional cap screw 10 and a female fastener element in the form of a flange nut 12 having a radially flared flange portion adjacent a bearing surface 14. The bolt 10 and nut 12 are complementally threaded so as to be engageable with another in a relatively free-running combination to produce an axial clamping force on work 16. Although a single reference character is used to designate the work 16, it is clear from FIG. 1 that the normal application of fastener combination 10, 12 involves the clamping or fastening of two or more elements.

In the combination of FIG. 1, the external bearing surface 14 which abuts the work 16 in the normal fastener combination is skewed or non-orthogonal relative to the common thread axis of the nut 12 and bolt 10. Accordingly, when the nut 12 is wound up on the shank of bolt 10 to abuttingly engage the surface of work 16, a counterclockwise moment is generated, assuming an angular orientation of the nut 12 as shown in FIG. 1. This moment tends to laterally load the nut 12 against the threaded shank of the bolt 10 to jam or otherwise substantially engage the threads on one side of the thread axis at the top of the nut and on the other side of the thread axis at the bottom of the nut while disengaging or opening the threads between the nut and bolt on the other sides as is clearly shown in FIG. 2.

It is to be understood that the skew or angle of non-orthogonality of the bearing surface 14 is exaggerated in FIG. 1 for purposes of illustration, the angle of non-orthogonality being such as will in all cases take up the clearance between the nut and bolt which is generated by the worst possible combination within manufacturing tolerances; i.e., greatest clearance.

Figure 3:
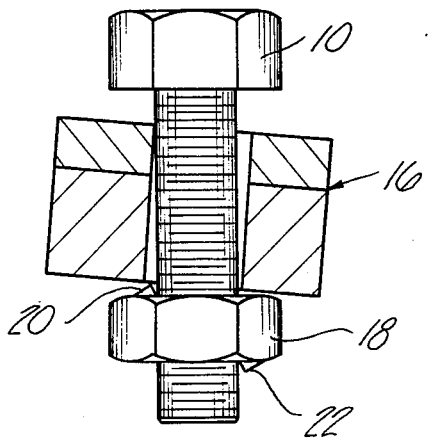
FIG. 3 is a schematic diagram of a fastener combination including a nut having external protuberances on the bearing surfaces thereof.
Figure 4:
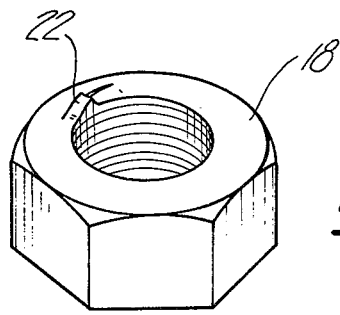
FIG. 4 is an enlarged perspective drawing of the nut in the combination of FIGS. 2 and 3.

Looking to FIGS. 3 and 4, a second embodiment of my invention is shown in a fastener combination comprising conventional cap screw 10 and octagonal nut 18 threaded together to secure work 16. Formed on the opposite bearing surfaces of nut 18 are protuberances 20 and 22, each of which lies to one side of the thread axis so as to cause a skewed or non-orthogonal work contacting plane regardless of the manner in which the nut 18 is threaded onto the bolt 10. The end result of the tightened fastener combination of FIG. 3 is a lateral loading or jamming effect but is somewhat different from that which obtains in the combination of FIGS. 1 and 2 in that the nut jams in on one side only, rather than cocking into opposite engagements at top and bottom as described above. As shown in FIG. 4, the protuberance 22 may be struck or gouged out of the bearing surface of the nut 18 using conventional machinery. The protuberances 22 and 23 are preferably radially close to the tapped hole in the nut and fairly sharply tapered toward the top so as to enter into the screw hole in work 16 to jam and laterally load the bolt.

Figure 5:
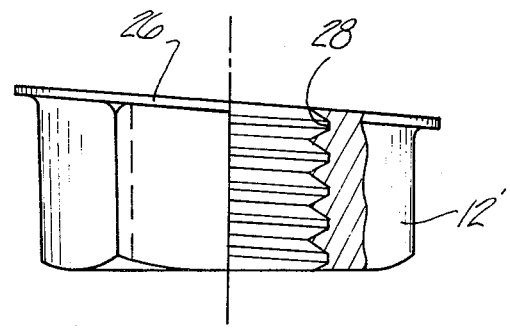
FIG. 5 is a side view, partly in section, of still another fastener which embodies my invention and in which an improved performance is achieved by virtue of a modified internal thread form.

FIG. 5 shows a still further form of my invention embodied in a nut 12' wherein the non-orthogonal work contacting plane is defined by a skewed bearing surface similar to the nut 12 of FIG. 1. In addition, I have found that the jamming or locking effect of my invention can be enhanced by truncating the internal thread form of the nut 24 adjacent the major diameter to form a helical flat 28. This causes the crown of the thread form on the male element to engage the helical flat 28 as lateral loading between the nut and bolt occurs, while simultaneously reducing the friction generated at the pitch diameter so as to provide a more reliable relationship between the torque required to tighten the nut and the tension generated in the bolt.

Figure 6:
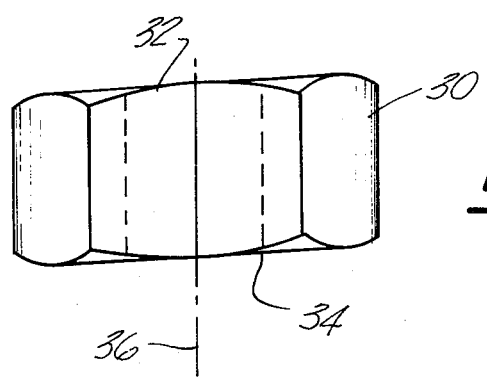
FIG. 6 is a side view of still another embodiment of my invention wherein both bearing surfaces of the nut are skewed.

FIG. 6 shows a still further form of my invention wherein nut 30 exhibits, in side elevation, a trapezoidal skewed configuration wherein the opposite bearing surfaces 32 and 34 are parallel to one another but are both non-orthogonal relative to the thread axis 36. Such a nut, although non-conventional in external configuration, may be stacked upon itself in a suitable holder to facilitate a gang-tapping operation.

I have found that all of the forms of my invention exhibit extraordinary resistance to loosening in the presence of vibration. Moreover, my invention does not exhibit the high on-torque requirements of the Dardelet-type fastener, nor does it require a special thread form on the male fastener element. When embodied in a free-running combination, my fasteners are easily disassembled under normal conditions.

Figure 7:
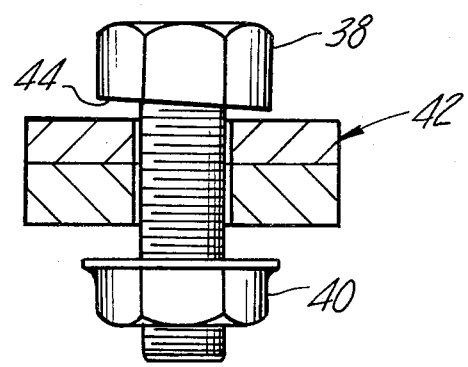
FIG. 7 is a schematic diagram of a fastener combination having the skewed surface on the bolt.

Referring now to FIG. 7, there is shown a modified bolt 38 having a conventional thread form matingly engaged with a conventional flanged nut 40 to hold workpieces 42 in clamped engagement. In the combination of FIG. 7, the modified nut 38 exhibits a skewed bearing surface 44 immediately under the head so as to produce the skewing or cocking action which is essential to engage the crown of the conventional bolt thread with the flat of the nut thread form as previously described with reference to FIG. 5. Again, a relatively loose or freerunning combination is contemplated by virute of the fact of substantial radial clearance between the nut and bolt thread forms under unloaded conditions. As aforesaid, this can be accomplished while still realizing the benefits of a selflocking action under loaded conditions by forming the helical flat in the nut thread form thereby to substantially truncate the major diameter of the nut.

Figure 8:
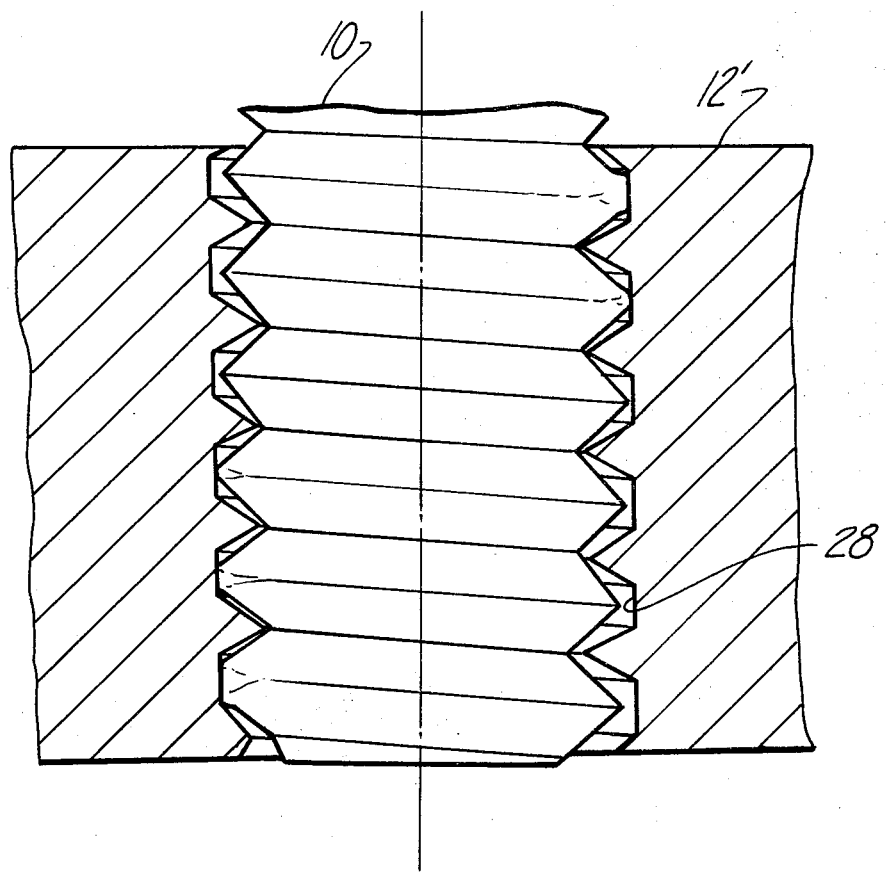
FIG. 8 is a partial sectional drawing to show how the crown of a conventional bolt thread engages the flat in the nut.

Referring to FIG. 8, there is shown a substantially enlarged cross-sectional view of the conventional bolt 10 threaded into the modified nut 12' having the truncated crown thereby to exhibit the helical flat 28 previously described with reference to FIG. 5. The combination of bolt 10 and nut 12' shown in FIG. 8 is exhibited in the axially loaded and, therefore, laterally shifted condition. The conventional bolt thread form exhibits a relatively sharp pointed crown which, when unloaded, is dimensioned so as to provide a radial clearance between the bolt and nut thread forms so as to provide a free-running operation. However,, when axial loading occurs, the condition illustrated in FIG. 8 quickly obtains wherein the crown of the bolt on the upper right-hand portion, as shown in FIG. 8, and on the lower left-hand portion begins making substantial frictional contact with the flat 28 of the nut 12'. Under substantial loading conditions actual deformation of the bolt crown begins to occur as is evident in the drawing. Because of the existence of the flat 28, the substantial engagement and resulting locking action between the bolt and nut occurs under conditions of loading which are much less than those which would be necessary if the flat 28 were not present.

It is to be understood that my invention, although described herein with respect to four specific embodiments, may be susceptible of numerous additional configurations and applications including application to segmented or inserttype female fastener elements. Accordingly, the foregoing description is not to be construed in a limiting sense.

The embodiments of the invention in which an exclusive property or privilege is claimed are defined as follows:

1. In combination: a male fastener element having a standard external thread form characterized by a relatively sharp helical crown and a female fastener element of fixed configuration having an internal thread form adapted to mate with said external thread form, the internal thread form of the female fastener element being truncated at the root thereof to form a helical flat which is substantially parallel to the thread axis and uniformly disposed therearound, the thread depth of said female element being such as to create a small predetermined radial clearance between said flat and the sharp crown of the standard male thread when conjugal therewith to produce free-running operation thereof under non-loaded conditions, the thread form of said female fastener element providing overall radial clearance from the threads of such male element sufficient to allow relative lateral displacement of said elements to engage the crown of the male thread with the said helical flat; one of the fastener elements having an external bearing surface which is non-orthogonal to the thread axis thereof such that when the female fastener element is tightened on the male fastener with the said bearing surface against a workpiece, the female fastener element is laterally loaded against the male fastener element causing the crown of male fastener thread form to jam laterally against the helical flat over at least part of the area of mutual threaded engagement thereby to resist loosening of the female and male fastener elements under conditions of vibration.

2. The fastener combination defined in claim 1 wherein the female fastener element is a nut having a threaded central bore and a flange adjacent to and forming part of said external bearing surface.

* * * * *